United States Patent
Goettsch et al.

(10) Patent No.: US 9,770,754 B2
(45) Date of Patent: Sep. 26, 2017

(54) DEVICE AND METHOD FOR FILTERING MOLTEN METAL

(71) Applicant: GM Global Technology Operations LLC, Detroit, MI (US)

(72) Inventors: David D. Goettsch, Shelby Township, MI (US); Jason R. Traub, Clinton Township, MI (US); Michael J. Walker, Shelby Township, MI (US); Brad A. Ohlrich, Bloomingnton, IN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 188 days.

(21) Appl. No.: 14/670,486

(22) Filed: Mar. 27, 2015

(65) Prior Publication Data

US 2016/0279700 A1    Sep. 29, 2016

(51) Int. Cl.
*B22C 9/08* (2006.01)
*B22D 17/30* (2006.01)
*C22B 9/02* (2006.01)
*F27D 3/14* (2006.01)

(52) U.S. Cl.
CPC ............. *B22C 9/086* (2013.01); *B22D 17/30* (2013.01); *C22B 9/023* (2013.01); *F27D 3/14* (2013.01); *Y02P 10/234* (2015.11)

(58) Field of Classification Search
CPC .......... B22C 9/086; B22D 17/30; C22B 9/023
USPC ......................................... 164/113, 303–318
See application file for complete search history.

(56) References Cited

U.S. PATENT DOCUMENTS

| | | | | |
|---|---|---|---|---|
| 5,676,731 A * | 10/1997 | Hitchings | ............ | B01D 29/096 164/134 |
| 5,979,534 A * | 11/1999 | Shibata | ................ | B22D 17/007 164/113 |
| 6,637,497 B2 * | 10/2003 | Herron | ................... | A23G 1/206 141/113 |
| 6,666,258 B1 * | 12/2003 | Kono | ..................... | B22D 17/28 164/312 |
| 2002/0179273 A1 * | 12/2002 | Ruhland | ................ | B22D 17/24 164/97 |

* cited by examiner

*Primary Examiner* — Kevin E Yoon

(57) ABSTRACT

A device and method for transferring filtered molten metal to a die casting mold. The device and method include a casting filtration system that includes a funnel and a continuously replaceable filter placed fluidly between a molten metal source and a casting mold. Both the funnel and filter are automatically moved into cooperation with a molten metal receptacle such as a shot sleeve prior to each casting operation, and then automatically moved out of the way so that pressurization of the filtered molten metal may take place in the receptacle. In addition, the filter may be formed on a continuous strand such that indexed movement of the strand will advance the used portion of the filter out of the way to make room for a new unused filter portion that will be ready for a subsequent repeated casting operation.

12 Claims, 3 Drawing Sheets

DEVICE AND METHOD FOR FILTERING MOLTEN METAL

BACKGROUND TO THE INVENTION

This invention relates generally to an improved way to pour molten metal used in a casting operation, and more particularly to filtering out inclusions from the molten metal during the filling of a horizontal high pressure die casting (HPDC) shot sleeve.

Low process cost, close dimensional tolerances (near-net-shape) and smooth surface finishes are all desirable attributes that make HPDC a widely used process for the mass production of metal components. By way of example, manufacturers in the automobile industry use HPDC to produce near-net-shape aluminum alloy castings for engine, transmission and structural components. In a typical HPDC process, molten metal is typically transferred to a casting mold through a series of channels, tubes and ladles that make up a filling system. This transfer typically takes place in two steps: a low pressure pour to a filler tube (called a shot sleeve), and a high pressure injection where movement of a piston or plunger in the tube forces the metal from the shot sleeve and into the casting cavity.

One transport system for HPDC shot sleeve filling is known as a dosing furnace trough system. In this system, a pressure or pump furnace is coupled to the shot sleeve with an inclined trough (which is also referred to as a dosing launder). The furnace bottom fills the required charge weight of molten metal to one end of the trough such that it then flows the length of the trough and drains into the shot sleeve. Devices to improve metal stream control by reducing the turbulence relative to a free-falling stream of molten metal as it impinges on the shot sleeve wall and pooling metal therein may also be used. Nevertheless, undesirable high metal velocities—and the resulting filling turbulence—may still be present in the shot sleeve. Furthermore, long trough lengths also create undesirably high metal surface areas and oxide films. Moreover, this system does not include a mechanism to clean the molten metal at the shot sleeve, as the generated oxides or furnace inclusions that reside in the metal at the entrance to the trough will be transported to the shot sleeve cavity.

Another metal transport system for HPDC shot sleeve filling is known as a tilt-pour ladle system. Typical designs of this type of system are similar to a pour basin in traditional sand casting molds, but without a sprue feature. In this system, a ladle is tilted to pour the molten metal through an external spout to the shot sleeve. Metal damage results from the turbulence of the impinging metal stream on the shot sleeve surface and the pooled melt within the shot sleeve. One method of reducing this filling turbulence is the use of a device placed above the sleeve entrance that collects the ladle metal stream and directs it into the shot sleeve. As with the trough-based system mentioned above, control of the metal stream location as it hits the shot sleeve wall and pooling metal may be its primary benefit in reducing metal damage. Nevertheless, neither this nor the trough-based system has a mechanism to clean the metal, instead leaving the generated oxides or furnace inclusions to remain in the pooled metal that is resident in the shot sleeve cavity.

Another method of eliminating this filling turbulence is described in U.S. patent application Ser. No. 14/159,866, filed Jan. 21, 2014 and entitled A METAL POURING METHOD FOR THE DIE CASTING PROCESS, the entirety of which is owned by the Assignee of the present invention and hereby incorporated by reference herein. In this approach, a special tilt pour ladle couples to a side orifice in the shot sleeve and rotates to introduce metal into the sleeve cavity, after which the assembly rotates to drain the ladle and place the shot sleeve orifice at the top. While the bottom filling of this approach is especially useful in eliminating turbulence and metal damage, it may add complexity. For example, the additional joints used to establish the relative rotation are exposed to molten metal for each casting; this may exacerbate maintenance and related foundry down-time concerns. Additionally, clearance constraints of the die casting machine may hamper the ladle motion, making implementation more difficult.

An additional method of reducing metal damage during the shot sleeve filling event is described in U.S. patent application Ser. No. 14/613,991, filed Feb. 4, 2015 and entitled METAL POURING METHOD FOR THE DIE CASTING PROCESS, the entirety of which is owned by the Assignee of the present invention and hereby incorporated by reference herein. This approach uses a tilt-pour ladle with a 360 degree nozzle that is fitted with a molten metal filter. A full ladle is rotated to place the nozzle and filter proximate to the shot sleeve such that in its final position, the filter is at or near the shot sleeve bottom surface for filling. The flow restriction of the filter reduces the metal velocity and turbulence of the incoming stream, while the physical capture of melt inclusions provides an additional benefit. The present inventors have recognized that a major hurdle to achieving such filtering is that the placement of the filter (in addition to its removal for periodic cleaning or servicing) may add significant time and expense to the process, and as such may make the use of a filter untenable, especially when used in conjunction with large-scale HPDC production (where hundreds or even thousands of castings may be produced each day in a single casting machine). Moreover, storage space for filters and their replacements in or around the shot sleeve is limited, while filter mishandling may cause significant damage to the shot sleeve or other parts of the filling system, further reducing the efficiency of the casting operation.

SUMMARY OF THE INVENTION

It is against the above background that embodiments of the present invention generally relate to the use of a continuously replaceable filter to improve the quality of the molten metal that is delivered to a horizontal die casting shot sleeve. In this way, casting quality is improved while not burdening the operation with complex filter storage, placement and disposal externalities.

According to a first aspect of the present invention, a continuously replaceable filter and a funnel cooperate as part of a system to deliver filtered molten metal from an upstream delivery vessel (such as a ladle or trough) to a downstream casting mold receptacle (such as the aforementioned shot sleeve or related runner). While the present disclosure focuses on HDPC equipment and ancillary processes, it will be appreciated by those skilled in the art that the moveable filter and funnel may also be coupled to other non-HPDC casting operations that may have a need for molten metal filtration. In these other configurations, a pouring basin, riser or other opening may be used in place of the shot sleeve; either variant is deemed to be within the scope of the present invention.

In the present context, a continuously replaceable filter is one that can be automatically placed in and removed from the molten metal flowpath without manual intervention between successive casting operations. In one particular form, the filter is delivered to and removed from the system as part of a continuous spool or roll-based mechanism. Such a configuration provides the benefits of a one-time use filter without having the disadvantage of manually placing a new discrete filter between the molten metal source and shot sleeve, runner or related receptacle for each casting operation. In optional forms, the system may include additional components, including a runner, sprue, fill cap, gates, cope, drag and other components associated with a horizontal HPDC system.

According to another aspect of the present invention, a high pressure die casting system includes a mold cavity, a filling system fluidly cooperative with the mold cavity to deliver molten metal to it, and a filtration system fluidly disposed between the molten metal source and a shot sleeve that makes up a part of the filling system. As discussed above, the filtration system includes a continuously replaceable filter and a funnel fluidly cooperative with the filter such that a quantity of molten metal being conveyed from the molten metal source passes through a flowpath defined by the funnel and the filter prior to receipt within the shot sleeve. A molten metal source may include a furnace, as well as a ladle that receives molten metal from the furnace. As will be discussed below, the discharge end of the ladle may be equipped with a nozzle-like extension that mimics features of the aforementioned funnel in order to perform a comparable molten metal delivery function to the shot sleeve. In a preferred form, the filter portions are stored as part of a continuous strand (which is more preferably delivered and taken up on rolls) to minimize storage; indexing or clocking movement of the rolls ensures accurate delivery of a used filter portion away from the casting system while simultaneously delivering a fresh unused filter portion into position between the molten metal source and the shot sleeve. Depending on the cleanliness of the metal being filtered, the roll can move during the metal delivery process, presenting clean filter area to the flowing metal. This reduces the risk of clogging the filter, stopping the flow of metal into the shot sleeve and interrupting the metal casting process According to another aspect of the present invention, a method of delivering molten metal to a die casting mold is disclosed. The method includes providing a filling system fluidly between a molten metal source and the mold, introducing a quantity of molten metal from the molten metal source through a filtration flowpath defined by filling system components, moving at least some of the filling system components away from the shot sleeve to enable pressurizing of the filtered molten metal that has collected in a cavity that is formed in the shot sleeve. Once the filtered molten metal has been moved to a mold cavity or other destination via the pressurization, a new filter (along with the reusable funnel) may be moved into place near the entrance of the shot sleeve so that a new casting operation may be commenced. As before, both the filling system and filtration system may be thought of as either independent systems of continuous parts of the same system; in either view, they cooperate to filter and deliver molten metal to a mold cavity or related workpiece from a molten metal source.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
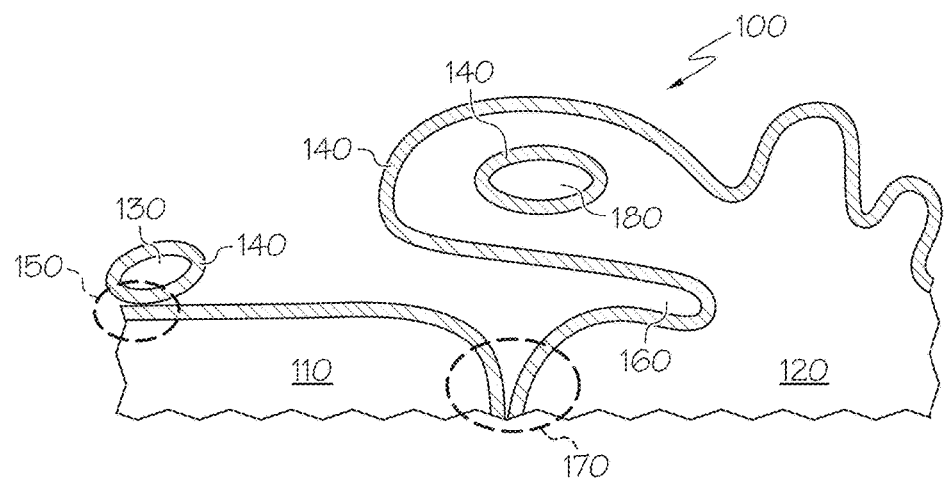
FIG. 1 shows a representative bi-film produced by turbulence of the prior art.

Referring first to FIG. 1, multiple forms of defects in an aluminum alloy are shown. Upon heating into liquid (i.e., molten) form 100, various streams of aluminum (for example, first stream 110 and second stream 120, as well as droplets 130) interact in varied ways. When processed in an oxygen-containing environment, oxide films 140 may form on the outer surface of the liquid aluminum, including the first stream 110, second stream 120 and droplets 130. A bi-film 170 forms when the two oxide films 140 from respective first stream 110 and second stream 120 meet. Bi-films also form when turbulence-induced droplets land on the metal stream, as shown at 150. While bi-films 150, 170 are an inherent part of almost every casting process, they are generally not detrimental to casting mechanical properties unless the oxide film 140 is entrained in the bulk of the alloy, as shown at location 160 due to the folding action when two separate streams, first stream 110 and second stream 120, meet at large angles (typically more than 135 degrees, where the splashing action of one stream collapses onto another stream to form a cavity therebetween). Such a formation can have significant impacts on overall material integrity and subsequent casting scrap rates. Likewise, entrained gas 180 may form from the pouring action of liquid metal, creating additional entrained oxides. As mentioned above, when liquid metal is poured or forced into a mold or shot sleeve in a conventional manner, it is possible to trap large gas bubbles that result in one or more of the inclusions shown.

Referring next to FIGS. 2A and 2B and 3A and 3B, portions of a horizontal HPDC system 200 that are configured to cooperate with a continuous tape-like strand 210 of the present invention are shown. These portions include shot sleeve 220 that defines a generally cylindrical cavity therein such that a plunger 230 introduced into the proximal end of shot sleeve 220 may move in a reciprocating translational motion along a substantially horizontal direction within the cavity in order to pressurize a quantity of poured molten metal 100 that is contained within the shot sleeve 220. Although not shown, the distal end of the shot sleeve 220 may be fluidly connected to a network of gates or related channels to convey the molten material to the mold cavities; such a network is commonly referred to as a gating (or charging) system. A funnel 250 is also translationally moveable (such as by movement of an electric motor such as a stepper motor, not shown) along a substantially vertical direction within the proximal end of the shot sleeve 220. The proximal end 260 of shot sleeve 220 defines a cavity or orifice 261 that helps provide a transition for the introduction of molten metal 100 into the shot sleeve 220. A set of upstanding guide rails 265 may straddle the proximal end 260 of shot sleeve 220 for at least a portion of the travel path of the strand 210 in order to help keep it aligned as it moves toward the cavity 261. In an alternate form (not shown), a fill cap may act as a cover that can be made rotatable as discussed in the co-pending U.S. patent application Ser. No. 14/159,866 discussed above. In yet another alternate form (not shown), the funnel 250 may be inserted in a rotary fashion into the proximal end 260 of shot sleeve 220, as well as through a combination of translational and rotational movement; all such forms are deemed to be within the scope of the present invention.

Figure 2A:
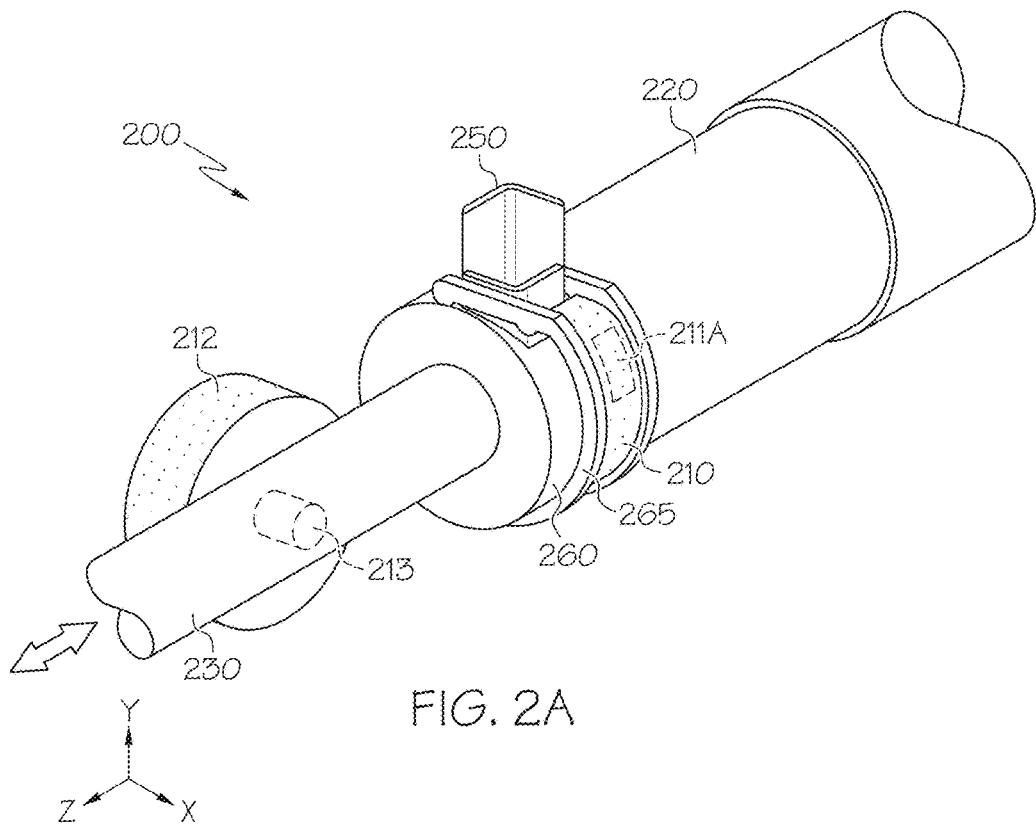
FIGS. 2A and 2B show views of the cooperation of the filter and an HPDC shot sleeve according to an aspect of the present invention.
Figure 2B:
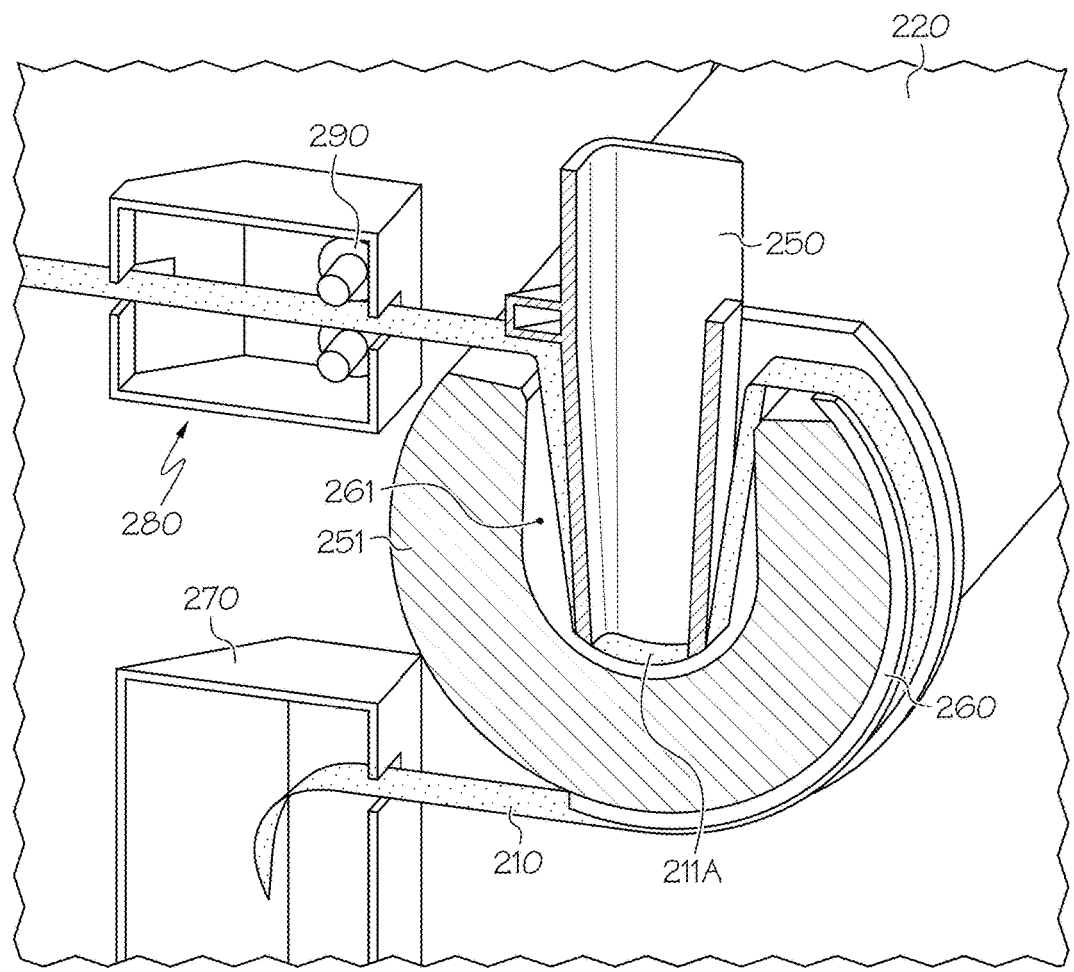
Figure 3A:
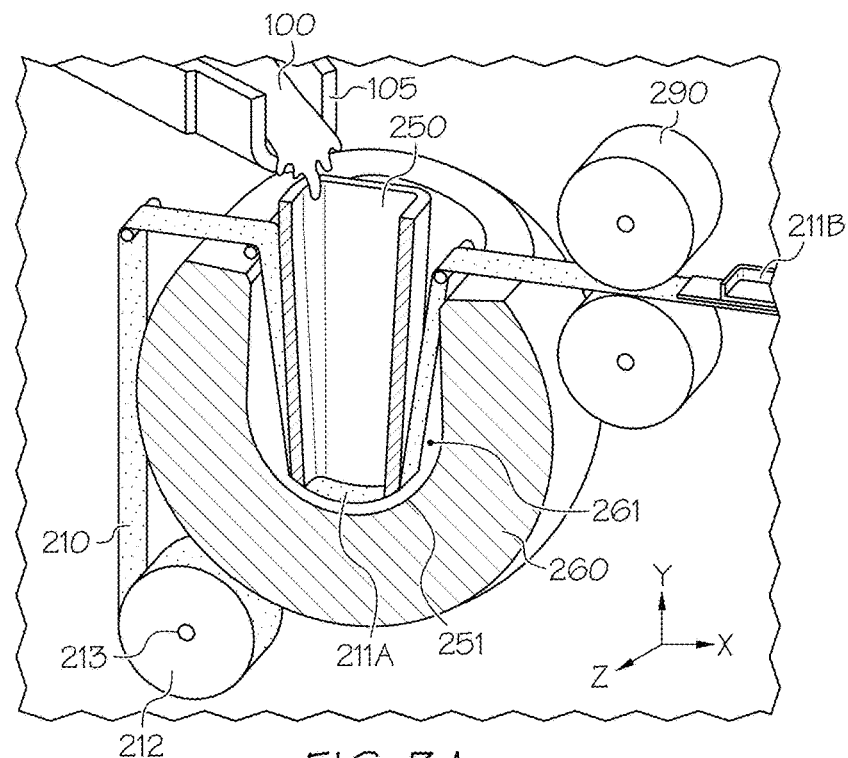
FIGS. 3A and 3B show sequential steps depicting the relative movement of the filter and a funnel relative to a shot sleeve, where in FIG. 3A the filter and funnel are in position to accept unfiltered molten metal, while in FIG. 3B the funnel and filter are moved upwardly out of engagement with the shot sleeve so that the next casting operation may be performed.
Figure 3B:
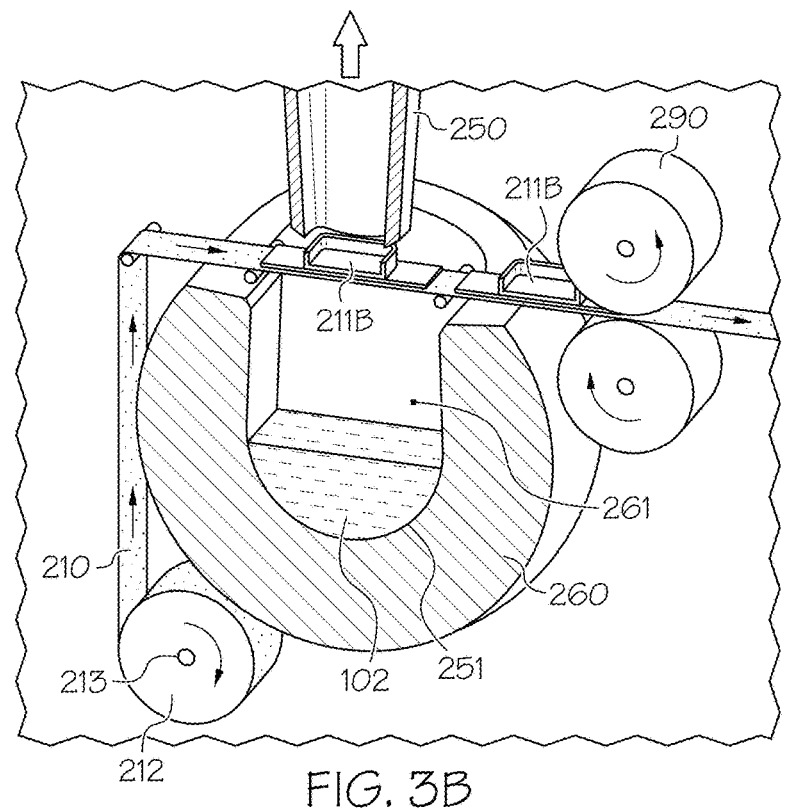

As shown, the travel path for the strand 210 with its filters 211 defines a beginning and an end, such as through respective delivery 270 and take-up 280 mechanisms, where in one form the delivery may be made from a simple box-like container (as depicted with particularity in FIG. 2B) or a spooled reel (as depicted with particularity in FIGS. 2A, 3A and 3B). Similarly, take-up is preferably through an appropriate means where continuing tension may be maintained on the strand 210 and filters 211 to avoid bunching, as well as to provide ample force to pull the strand 210 and filters 211 through the relatively linear path depicted in FIG. 3B where the funnel 250 has been moved out of the way during a change of filters 211 between sequential casting operations.

In one preferred form, movement of the strand 210 with filters 211 only takes place in between successive casting operations; in that way, they are only exposed to significant tensioning loads during periods where their travel path adjacent the shot sleeve 220 defines a substantially straight, linear path as depicted in FIG. 3B. Nevertheless, in an alternate embodiment (not shown), the strand 210 with filter 211 may be moved across the funnel 250 during a molten metal 100 pouring operation. This latter configuration is particularly useful when excessively dirty (i.e., oxide filled) molten metal 100 is contained in the furnace or ladle 105.

In a preferred form, the strand 210 is formed with a porous, screen-like surface structure that is flexible enough to occupy a tortuous shape (or profile) defined by the cooperative action of the funnel 250 and the cavity 261 during at least the part of the casting operation where the funnel 250 and a filter 211 that is defined on the surface of strand 210 are inserted into the cavity 261. In the present context, while a substantial entirety of the surface of strand 210 defines screen-like filter attributes, the filters 211 discussed herein are more easily understood as defining discrete portions that correspond in size and shape to the funnel exit face 251 with which it forms a selective filtration flowpath (also referred to herein as a filtration path); these discrete portions (shown in exemplary form in FIG. 3B) may be thought of as "used portions" (also called spent filters 211B) and "unused portions" (also called fresh filters 211A); related terms, such as "first portions" to designate a predecessor filter and "second portions" to designate a successor filter may also be used herein to distinguish respective places in line on the continuous strand 210. All such indicia will be apparent from the context. Moreover (as discussed above), traversal of the strand 210 and filters 211 preferably only takes place once their travel path has been substantially straightened out so that sharp bends, edges and other undulations are avoided.

Significantly, the close-coupling of the bottom of the funnel 250 to the generally crescent-shaped lower surface of the cavity 261 helps promote a sealed passageway such that when a portion of strand 210 is present, the only way the molten metal 100 can enter the shot sleeve 220 is through the filter 211 that is present within the exit face 251 that is formed in the bottom of funnel 250. In other words, the strand 210 is contoured to offset match the contour of the shot sleeve 220 bottom surface. This minimizes the metal drop after the filter 211 and reduces the time it takes for the strand 210 to be totally submerged and the metal surface area reduced. In one preferred form, an offset of between 5 and 12 millimeters (mm) is used; numbers higher than this tend to cause the quality of the molten metal 100 to suffer. By such positioning proximate the final pooling location within the shot sleeve 220, in addition to reducing or removing inclusions, the short drop the filter 211 reduces the metal velocity entering the shot sleeve 220, which helps to reduce the turbulence and oxide generation of the filtered molten metal stream 101 as it fills the shot sleeve 220 As mentioned above, in addition to reducing or removing inclusions, filter 211 reduces the metal velocity entering the shot sleeve 220, which helps to reduce the turbulence and oxide generation of the filtered molten metal stream 101 as it fills the shot sleeve 220.

Moreover, the shape of the cavity 261 (shown presently with a gently tapered geometry) permits the funnel 250 and filter 211 to be raised and lowered such that they are selectively placed into and removed from the fluid entrance at the proximal end of the shot sleeve 220. In various embodiments, the filter 211 is made from fiberglass or some other material that is both chemically inert relative to molten metal 100 and flexible and strong enough to traverse the tight bends formed in cavity 261 without binding or breakage. Examples of such other material include steel wire mesh, carbon fiber mesh, tinplate, or combinations thereof. In addition, the mesh size of the filter 211 determines the minimum particle size of inclusions such as deleterious oxides transferred from the dip well bath which are captured. In various embodiments, the screen size of the filter 211 is made up of an approximately 9 to 17 mesh with approximately 1.8 to 0.9 mm width opening and an approximately 46 to 36% open area. A non-limiting exemplary filter 211 includes a 17 mesh screen with a width opening of 0.9 mm and an open area of approximately 36%. In any event, it will be appreciated by those skilled in the art that too small of a mesh size must be avoided to minimize the chance of unnecessarily constricting the flow of molten metal 100, while too large of a mesh size also needs to be avoided in order to reduce the likelihood of deleterious inclusions passing through. In one exemplary form, the pore size selection of the filter 211 may be made to allow for an approximately 6 pound/sec flow rate of molten metal 100 into the horizontal shot sleeve 220 with no oxide films larger than 1×1 mm.

Significantly, the porous, screen-like construction of the strand 210 is such that a portion of it that corresponds to the two-dimensional projection of the funnel aperture 251 shape onto it permits it to function as a filter 211. The delivery to and removal from the region immediately below the funnel aperture 251 of the strand 210 may be coupled to the casting operation of the remainder of the horizontal HPDC system 200 via controller (not shown) to enable automated, indexed movement of a fresh filter 211A into fluid cooperation with the aperture 251 and related indexed movement of a spent filter 211B away from such fluid cooperation. In one embodiment, the strand 210 may be in roll form 212 such that it can be mounted onto rotatable spindles 213 such that automated take-up and delivery may be effected. Furthermore, a motor or robotic manipulation device used to move the funnel 250 may also be operated by such a controller.

Referring with particularity to FIGS. 3A and 3B, the sequential steps in filtering molten metal 100 are shown. In FIG. 3A, the unfiltered molten metal 100 is introduced from a ladle 105 to the shot sleeve 220 by pouring into funnel 250 that defines a slightly tapered shape along the downwardly-directed flowpath. Significantly, there is very little taper in funnel 250, as the cross section requirement to achieve the 6 lbs/sec molten metal 100 flow rate is too high to have it be form fitting to a falling metal stream; in this regard, its shape differs from that of a conventional sprue. Tautness in the strand 210 (such as that imparted to it by tensioning take-up rollers 290 that may act in a stand-alone manner such as shown in FIGS. 3A and 3B, as well as part of a larger take-up structure 280 as shown in FIG. 2B) helps to ensure enough structural rigidity in the strand 210 such that the exit face 251 of the funnel 250 and the filter portion 211A of strand 210 form a tight fit between them along bottom (or exit) face 251. In this way, together they define a substantially sealed molten metal flowpath between the funnel 250 and the lower portion of the shot sleeve 220 where the filtered molten metal 102 as shown in FIG. 3B) pools. As such, flow velocity and impurities are reduced downstream of the filter while minimizing leakage around the sealed area defined by the funnel exit face 251 and filter 211A. FIG. 3B shows withdrawal of the funnel 250, as well as the indexed movement of the filter 211A away from the fluid entrance of the sleeve 220 to permit subsequent pressurizing applications made possible by the reciprocating movement of the plunger 230 of FIG. 2A. The relative linear and planar shape of the strand 210 in this raised position differs from the three-dimensional, tortuous shape depicted in FIG. 3A; in this way, indexing movement of the strand and the filters 211A, 211B is simplified in the manner discussed above. Moreover, the linear shape of the strand 210 during its indexing movement (shown presently along the direction indicated by the arrow) helps to keep the spent filter 211A substantially flat so that the captured inclusions that have been filtered out of the molten metal 100 and are residing on the filter 211A are less inclined to break off and fall back into the lower portion of the cavity 261 during movement.

In an alternate embodiment (not shown), the fluid-routing function of the funnel 250 may be achieved through a spout-type ladle with a similar downward-extending exit face formed at the discharge end of ladle 105 that is shown in FIG. 3A. Because of possible clearance issues, the fluid entrance of the shot sleeve 220 may be modified to accommodate the ladle 105. Regardless, either funnel variant is deemed to be a functional equivalent within the claimed and disclosed invention. For example, the trough formed in the ladle 105 can have an integral exit that penetrates in a vertically-downward direction into the shot sleeve cavity 261 to improve metal stream control by reducing the turbulence relative to a free-falling stream. Movement of such a device may be achieved in a manner similar to the funnel 250.

Automated movement of both the filter 211 and funnel 250 within the cavity 261 formed in the shot sleeve's proximal end 260 shows how prior to the introduction of the molten metal 100, the funnel 250 is lowered into the trough-like bottom of the cavity 261. The generally arcuate shape of the cavity 261, coupled with the generally planar (within the X-Z plane) shape of the exit face 251 creates a tight, sealing fit between the two around the peripheral edges of the filter 211 while leaving a crescent-shaped pooling region 262 within cavity 261. Molten metal 100 that passes through the filter 211 at this location becomes filtered molten metal 101 that can collect within the cavity of the shot sleeve 220. The structural cooperation between the exit face 251 and the adjacent arcuate surface of the cavity 261 imparts a sufficient pressure or contact load to the filter 211 to ensure that a substantial entirety of the molten metal 100 being delivered through the funnel 250 passes through the filter 211 without any leakage around the edges where the filter 211 and exit face 251 intersect. As shown with particularity in FIG. 3B, withdrawal of the funnel 250 and indexed movement of the filter 211 permits subsequent pressurizing applications of the pool 102 of molten metal within the cavity of shot sleeve 220 by the action of the plunger 230 of FIG. 2A, as well as setup for a subsequent repeat casting operation. Significantly, the use of rollers 212 and related tensioning equipment can help ensure that the strand 210 remains relatively taut during the substantial entirety of the filter 211 transport and placement operation.

Significantly, the roll-based approach depicted herein allows local storage of the filters 211 immediately adjacent the shot sleeve 220. Importantly, the compact, automated filter 211 and funnel 250 movement structure is such that it can form a retrofit package that includes simple bolt-on connectivity to the shot sleeve 220 and horizontal HPDC system 200 support structure (not shown). This places a filter at bottom of the sleeve with low storage, placement and disposal costs. Importantly, the present invention may be retrofitted on existing shot sleeves, runners or related HPDC molten metal feed equipment. A die-casting charge filtration system that minimizes metal damage by bottom filling shot sleeve, all in a compact, bolt-on unit. Moreover, such an approach as discussed herein is compatible with the trough-funnel system and nozzled ladle systems discussed above. Depending on the size of the rolls 212 used to deliver and take up the strand 210 and filters 211, it may be more convenient to have them located away from the die casting machinery. For example, if the roll 212 were larger (for example, with a roughly one meter diameter), it may be preferable to have a strand 210 delivery platform include additional spools, tensioners, guides and related conveying equipment such that the larger rolls 212 may be placed in a more suitable location; either variant is deemed to be within the scope of the present disclosure.

The two-stage cooperative movement of the filter 211 and funnel 250 relative to the introduction of the molten metal 100 into the shot sleeve 220 takes place each time a new component is being cast. The funnel 250 egress from the sleeve 220 allows the die casting cavity (not shown) to be injection filled via the translational movement of the plunger 230 into the shot sleeve 220 internal cavity. Upon upward movement of the funnel 250 out of the cavity 261, the previous clamping pressure imparted by the portion of the funnel 250 that defines the exit face 251 is removed, thereby allowing the strand 210 to be indexed in order to present a fresh filter 211A into the bottom of the cavity 261 for the next molten metal 100 pour. The used filter 211B can then be conveyed toward a take-up reel or related spent filter 211B collection device for subsequent disposal. Significantly, cooperative movement of the strand 210 relative to the portion of the funnel 250 defined by its exit face 251—coupled with the shape and placement of the cavity 261 relative to the bottom of the shot sleeve 220—ensures ample pressure to seal the filters 211 that are formed within the strand 210 such that upon receipt of molten metal 100 from a source (such as tilt pour ladle, a nozzled ladle or a trough system), the filtering takes place in such a way to remove inclusions while keeping critical fall heights of the molten metal 100 within limits. As will be understood by those skilled in the art, the critical fall height is the vertical distance above which a molten metal should not be exposed to in order to avoid the deleterious effects of bifolds and related inclusions that arise when a molten metal critical velocity (which for most metals is between about 3 mm and 15 mm) is exceeded. As such, the operation of the funnel 250 with and filter 211 (having a clean roll portion 211A on one side of the funnel's exit face 251 and a used length 211B on the other) promotes the delivery of a low velocity, filtered molten metal stream 101 to be delivered to the bottom of the shot sleeve 220 where inclusions (such as deleterious oxides mentioned above are trapped to remain behind on the filter 211.

It will be appreciated by those skilled in the art that the feed direction of the strand 210 with filters 211 is shown going in one instance from right-to-left (FIG. 2B), and in the other from left-to-right (FIGS. 3A and 3B). In actuality, the proper feed direction will be dictated by the placement of the strand 210 relative to the shot sleeve 220, as well as to other equipment that makes up the filling system; either feed direction variant is deemed to be within the scope of the present invention.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Moreover, the term "substantially" is utilized herein to represent the inherent degree of uncertainty that may be attributed to any quantitative comparison, value, measurement, or other representation. As such, it may represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A casting filtration system comprising:
    a continuously replaceable filter configured to be placed fluidly between a molten metal delivery vessel and a casting mold receptacle having a shot sleeve that defines a molten metal-receiving aperture formed therein; and
    a funnel fluidly cooperative with said filter such that a quantity of molten metal being conveyed from said delivery vessel passes through a flowpath defined by said funnel and said filter prior to receipt by said receptacle, and
    wherein said funnel is disposed in one of a first and a second position, in said first position said funnel is disposed outside of said casting mold receptacle, and in said second position said funnel is disposed inside of said casting mold receptacle.

2. The system of claim 1, wherein said filter is formed as part of an elongate strand of porous material that is coupled at one substantial end thereof to a strand roller and at the other substantial end thereof to a pair of tension rollers.

3. The system of claim 2, wherein at least one of said delivery mechanism and said take-up mechanism comprises a spool onto which said filter is mounted.

4. The system of claim 2, wherein said filter comprises a material selected from the group consisting essentially of fiberglass fabric, carbon-based fabric, metal-based fabric, ceramic-based fabric and combinations thereof.

5. The system of claim 1, wherein said filter is fluidly cooperative with said aperture such that a quantity of said molten metal flowing through said filter is conveyed to said shot sleeve through said aperture.

6. The system of claim 5 further includes a flowpath cavity, and wherein said aperture terminates said flowpath cavity that is shaped to accept selective placement of said funnel and said filter therein.

7. The system of claim 6, wherein cooperative action between said cavity, said filter and said funnel during said selective placement leaves a vertical drop height between said filter and a pooling location within said shot sleeve that is less than a critical fall height of said quantity of molten metal.

8. The system of claim 7, wherein an exit face formed in said funnel is cooperative with a surface of said cavity and said filter during said selective placement to define a substantially sealed flowpath between said funnel and said shot sleeve.

9. The system of claim 5, wherein said shot sleeve defines a substantially horizontal flowpath along a substantial majority thereof.

10. The system of claim 1, wherein said funnel forms a moveable sprue.

11. The system of claim 1, wherein said funnel forms a moveable insert placed within a sprue.

12. The system of claim 1, wherein a ladle with a fluid-conveying extension defines said funnel.

\* \* \* \* \*